United States Patent [19]

Fardal et al.

[11] 4,130,980
[45] Dec. 26, 1978

[54] COMBINE AUTOMATIC TRAVEL CONTROL SYSTEM

[75] Inventors: Randolph G. Fardal, Westmont; Calvin P. Rickerd, La Grange Park, both of Ill.

[73] Assignee: International Harvester Company, Chicago, Ill.

[21] Appl. No.: 757,406

[22] Filed: Jan. 6, 1977

[51] Int. Cl.² .................................................. A01D 41/02
[52] U.S. Cl. .............................. 56/10.2; 56/DIG. 15
[58] Field of Search ........................ 56/10.2, DIG. 15; 130/27 R

[56] References Cited

U.S. PATENT DOCUMENTS

| | | | |
|---|---|---|---|
| 3,073,099 | 1/1963 | Andersen | 56/10.2 |
| 3,093,946 | 6/1963 | Pitt et al. | 56/10.2 |
| 3,481,122 | 12/1969 | Pool et al. | 56/10.2 |
| 3,514,929 | 6/1970 | Cornish et al. | 56/10.2 |
| 3,515,144 | 6/1970 | Morrison | 56/10.2 |
| 3,546,860 | 12/1970 | Pool et al. | 56/10.2 |
| 3,574,307 | 4/1971 | Theobald | 130/27 R |
| 3,583,514 | 6/1971 | Taylor | 56/10.2 |
| 3,606,742 | 9/1971 | Wieneke et al. | 56/10.2 |
| 3,609,947 | 10/1971 | Herbsthofer | 56/10.2 |
| 3,714,767 | 2/1973 | Hubbard et al. | 56/DIG. 15 |
| 3,935,866 | 2/1976 | Northrup | 56/DIG. 15 |

*Primary Examiner*—Russell R. Kinsey
*Assistant Examiner*—Paul J. Hirsch
*Attorney, Agent, or Firm*—F. David AuBuchon

[57] ABSTRACT

A system is provided for automatically controlling the forward speed of travel of a combine in response to feeder and separator loading and to reduce speed in proportion to grain losses exceeding predetermined limits. A hydrostatic transmission between the combine engine and drive wheels is controlled by a control element actuated by a hydraulic cylinder which is controlled from a control valve actuated by solenoids connected to the output of a comparator circuit. Signals from separator and feed load sensors and also from grain loss monitors are combined and applied to one input of the comparator circuit and a signal from a feedback sensor coupled to the hydraulic cylinder is applied to the second input of the comparator. The load sensors include potentiometers coupled to spring-loaded idler pulleys which are engaged with drive belts for the separator and feeder drive shafts and the feedback sensor is also a potentiometer. Switching means are connected in circuit with the load sensing potentiometers for obtaining optimum levels and sensitivities and the proper proportions of the separator and feeder load signals, according to machine load conditions. A manual control operates in conjunction with the transmission control element to limit maximum forward speed and to permit override of the automatic control.

22 Claims, 3 Drawing Figures

COMBINE AUTOMATIC TRAVEL CONTROL SYSTEM

This invention relates to an automatic forward travel control system for a combine and more particularly to a system with which threshing and separating processes are performed under optimum machine load conditions and with acceptable grain loss. The system is highly reliable in operation, is readily adjustable in accordance with operation conditions and is economically manufacturable.

BACKGROUND OF THE PRIOR ART

In the operation of combines, it is desirable to adjust operation in accordance with crop conditions and combines have been provided with infinitely variable transmissions for controlling the forward speed of travel, so that the operator may manually adjust the speed of travel, reducing the speed when moving into a region of dense crop conditions and increasing the speed when the crop is relatively thin and light. Systems have also been proposed for automatically controlling the forward speed. For example, the Andersen U.S. Pat. No. 3,073,099 discloses a combine control system wherein the drive train between the engine and the ground wheels include the pulley having a variable diameter, the transmission ratio being controlled in response to a device which measures the volume rate of flow of crop through a feeder. A modification is also disclosed in which the torque applied to a cutter bar is measured by an idler pulley engaged with a drive belt, the idler pulley being coupled to a servo valve controlling the transmission ratio.

The Pool et al. U.S. Pat. No. 3,481,122 and the Pool et al. U.S. Pat. No. 3,546,860 disclose ground speed or forward travel controls using mechanical linkages which respond to torque sensing means including spring-biased idler pulleys.

The Pitt et al. U.S. Pat. No. 3,093,946 discloses another type of arrangement in which a hydraulic motor is used to drive a threshing mechanism with the pressure in lines to the hydraulic motor being measured to measure the load of the threshing mechanism, and with an infinitely variable transmission being controlled hydraulically in response to the sensed pressure.

The Budzich U.S. Pat. No. 3,138,908 shows another control using variable diameter pulleys for driving ground wheels from an engine and a spring-loaded idler pulley engaged with a belt between the engine and a threshing mechanism, connected to a servo valve in a hydraulic system used to control the transmission ratio.

Such systems have limitations in that accurate control through hydraulic and mechanical arrangements is difficult and incorporating the controls in combines of different designs is a problem, especially in that there is usually very little physical space available for installation of additional control apparatus.

An electronic control system is proposed in the Cornish et al. U.S. Pat. No. 3,514,929 in which the torque applied to a feeder house conveyor drive is measured through the use of coaxially rotatable drive and driven elements interconnected by spring means, with the phase displacement of such elements being measured to develop a feed rate signal. The feed rate signal is combined with a feed rate reference signal to develop a signal which is compared, in turn, with a velocity set point signal and a velocity signal from a transmission transducer, the sum of which signals being used to control an infinitely variable transmission. This proposed system appears to have limitations in that it is not clear how the feed rate and velocity reference signals would be or could be adjusted in accordance with operating conditions to obtain optimum performance.

SUMMARY OF THE INVENTION

This invention was evolved with the general object of overcoming the disadvantages of prior proposed arrangements and of providing a system which will perform threshing and separating process under optimum machine loads and with acceptable grain loss and which is readily adjustable, highly stable and reliable and economically manufacturable. The system can be readily applied to combines having different characteristics.

In a system constructed in accordance with this invention, a variable speed transmission is provided between the engine and drive wheels of a combine and is controlled by a control element actuated by electrically actuatable actuating means connected to the output of a comparator circuit which has inputs connected to first and second transducer means which develop signals varying as functions of first and second variables, one being the power applied to components of the cutting, conveying and separating means of the combine and the other being the ratio of the variable speed transmission. No feed rate or velocity reference signals are used and with the proper level and with the proper sensitivities with which the signals are developed, it is possible to obtain highly stable and reliable operation with crop conditions varying within a broad range. At the same time, the advantages of electrical control are obtained and with the use of the feedback signal and a comparator circuit including amplifier means having a high gain, it is possible to obtain rapid response and insure highly stable operation.

An important feature relates to obtaining the proper operating levels and sensitivities according to the characteristics of the combine and the conditions of operation thereof. Proper sensitivity is obtained by adjusting or selecting the values of components, to obtain a proper ratio between a change in at least one of the variables and a change in the corresponding signal applied to the comparator circuit. The proper level is obtained by adjusting or selecting the values of components to obtain the proper relative levels of signals applied to the comparator circuits. Such adjustments or selections of the values of components may be readily made, involve only small electrical or electronic components and do not require any mechanical or physical changes in the construction of the combine.

In accordance with a specific feature, at least one of the transducer means comprises a potentiometer having end terminals connected to a voltage source and a movable contact moved in proportion to a change in the corresponding variable. The values of a pair of resistors in series between the potentiometer end terminals and the voltage source may be selected or adjusted according to particular requirements. For obtaining the proper level, a control potentiometer may be provided having end terminals connected through adjustable resistors through the voltage source and having a movable contact connected to the movable contact of the transducer potentiometer. Once the requirements of a particular combine are established, such adjustable elements may be replaced by fixed components having appropriate values. To adjust for different machine loads, switch means are provided having, for example, "low", "medium" and "high" range positions which control the values of resistances in the circuit.

In accordance with another feature, the power or load signal applied to the comparator circuit is not proportional either to the total power applied to the cutting, conveying and separating means of a combine or to the power of any one component but is a function of two variables, one being the torque applied to a separator shaft and the other being the torque being applied to a feeder shaft, such shafts being driven at a generally constant speed from the engine so that the torque indicates the power applied thereto. With this feature, the system can take into account the characteristics of the crop which effect the loading of the separator and the characteristics of the crop which effect the loading of the feeder. With correct proportioning of signals corresponding to such variables and control of the forward drive speed in response thereto, the system can more closely approach the requirements for optimum operation.

Preferably and in accordance with further features, the torques applied to the separator and feeder shafts are measured by means of spring-loaded idler pulleys engaged with the "tight" sides of the drive belts and directly linked mechanically to the shafts of potentiometers forming the load transducer means.

Additional features relate to the actuation of the control element for the variable speed transmission through a hydraulic cylinder which is controlled by a valve operated by solenoids connected to the output of the comparator circuit, and to the provision of a manually operable rod for overriding the automatic control system, setting the maximum forward speed of the combine and reducing the forward speed or causing reverse operation whenever desired.

Another important feature relates to the provision of grain loss monitor means for detecting grain at the discharge ends of the straw and chaff conveying means. The grain loss monitor means are operative to develop electrical signals which are applied through a signal combining circuit to one input of the comparator circuit and being operative to reduce the forward speed of the combine in proportion to the loss of grain over the above predetermined limits.

Another feature is in the provision of tachometer means responsive to the speed of operation of the engine and operative to supply a signal through the signal combining circuit to one input of the comparator circuit to reduce the load on the engine when the engine speed drops below a certain value. This feature is important because it is highly desirable that the speed of operation of the combine components which are driven directly from the engine be maintained within a certain relatively narrow range to obtain proper and efficient operation thereof.

This invention contemplates other objects, features and advantages which will become more fully apparent from the following detailed description taken in conjunction with the accompanying drawings.

DESCRIPTION OF A PREFERRED EMBODIMENT

Figure 1:
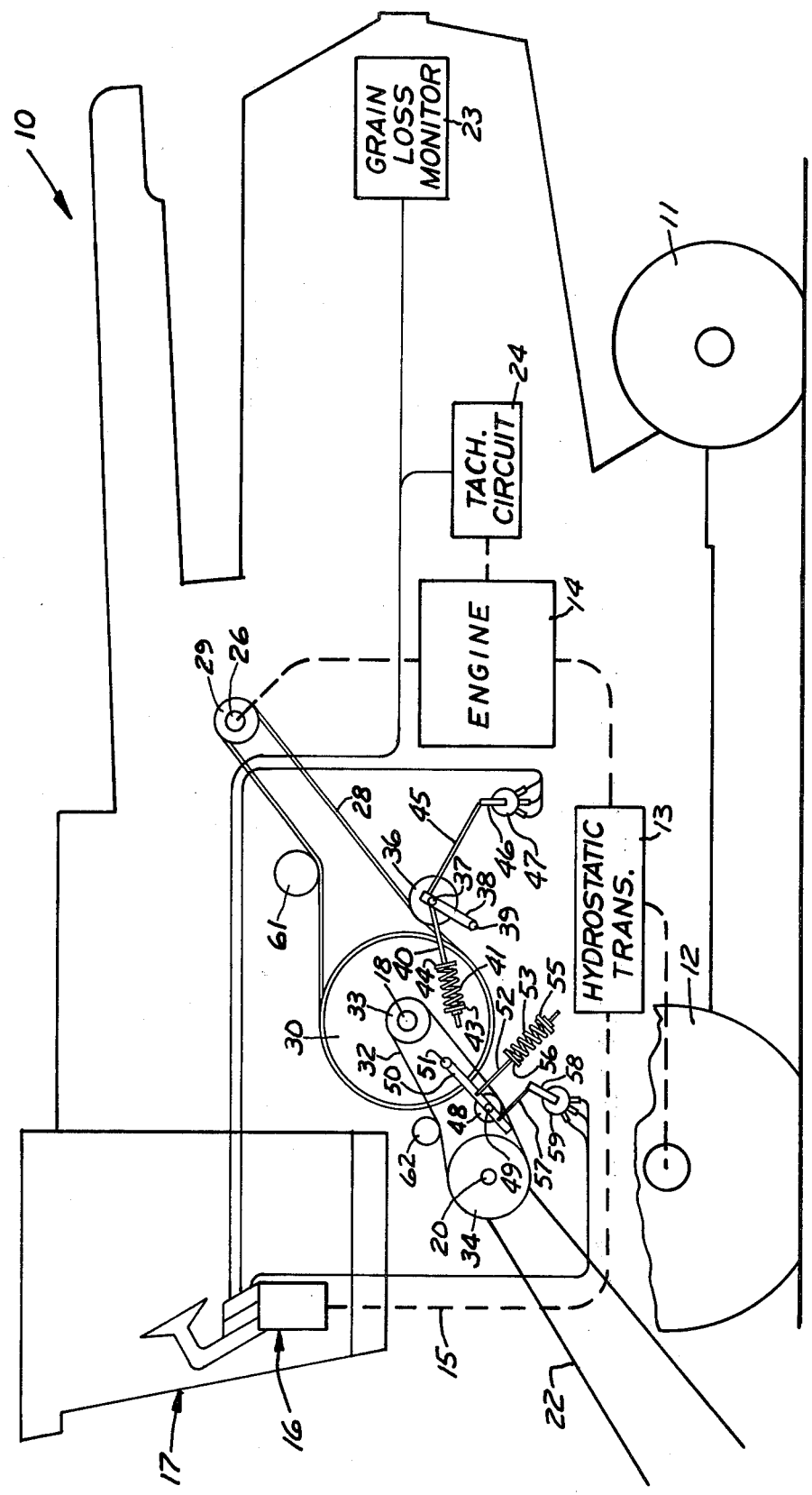
FIG. 1 is a diagrammatic view of a combine incorporating the automatic forward travel control system of this invention.

Reference numeral 10 generally designates a combine which includes the automatic forward travel control system of this invention. As diagrammatically illustrated in FIG. 1, the combine 10 includes rear steerable wheels 11 and front drive wheels 12 which are driven through a hydrostatic drive system 13 from an engine 14. The hydrostatic drive system 13 includes a fixed displacement motor and a variable displacement pump with a control valve being provided which is coupled through mechanical means 15 to a control unit 16 in the operator's cab 17. The combine 10 further includes a threshing cylinder driven by a shaft 18 and cooperating with a concave to provide a threshing action in a manner known in the art. Crop cutting and conveying means are provided for feeding cut crop to the threshing cylinder, including a feeder driven by a shaft 20 and having an upper discharge end adjacent the cylinder. At its lower forward end, the feeder receives the crop from a conventional grain platform or corn head which includes an auger for moving the crop to a central position to be picked up by the feeder. The auger and other platform and corn head elements may be driven from the feeder shaft 20, through a suitable belt or chain 22.

The combine may further include straw racks receiving straw from the cylinder and concave, a grain pan for receiving grain from the cylinder and concave as well as grain filtered through from the straw racks, and chaff removal means including chaffer sieves and air blast means for separating the chaff from the grain.

A grain loss monitor 23 is provided for cooperating with the straw racks and chaff removal means for detecting grain at the discharge ends thereof. Such a monitor is, by itself, known in the art and operates to develop an electrical signal proportional to the amount of grain passed from the straw racks and chaff removal means. It is noted that the construction of the straw racks, grain pan, chaff removal means and associated components are not illustrated since they may all be of a type known in the art. The same is true with respect to the cylinder, concave, feeder, grain platform and corn head.

A tachometer circuit 24 is provided which is coupled to the engine and which develops an electrical signal when the speed of the engine drops below a certain value.

With the control system of this invention, an optimum relationship is automatically obtained between the rate of supply of crop to the feeding and separating mechanism and the speed of operation thereof, regardless of wide variations in crop conditions, to obtain uniform and efficient separation of the grain from the straw and chaff. With the system, the crop cutting and conveying means and the cylinder are driven at a certain speed which may be maintained at a substantially constant value and the speed of forward travel of the combine is controlled in response to measurement of the power required to drive the threshing cylinder and also the power required to drive the cutting and conveying mechanisms.

A drive arrangement for the shaft 18 and the feeder shaft 20 is shown in FIG. 1. A shaft 26 is provided which is driven from the engine 14. The shaft 18 is driven from the shaft 26 through a belt 28 entrained on pulleys 29 and 30 on the shafts 26 and 18, respectively.

Feeder shaft 20, in turn, is driven from the shaft 18 through a belt 32 entrained on pulleys 33 and 34 on the shafts 18 and 20, respectively. To measure the power required to drive the shafts 18 and 20, spring-loaded idler pulleys are engaged with the "tight" sides of the drive belts 28 and 32. In particular, an idler pulley 36 is journalled on a shaft 37 carried by an arm 38 which is pivotal on a shaft 39. The free end of the arm 38 is connected to one end of a rod 40 the opposite end of which extends through a coiled compression spring 41 operative between a member 43 affixed to the rod 40 and a fixed support member 44, to urge the arm 38 in a counter-clockwise direction as illustrated in FIG. 1. The pulleys 29 and 30 rotate in counter-clockwise directions, as viewed in FIG. 1, and the pulley 36 is engaged with the "tight" side of the belt 28. As the load increases, the tension in the belt 28 is increased, urging the pulley 36 away from a plane through the axes of the shafts 18 and 26, to rotate the arm 38 in a clockwise direction as viewed in FIG. 1. Arm 38 is connected through a link 45 to an arm 46 on the shaft of a potentiometer 47, the position of the movable contact of the potentiometer 47 being thereby changed in accordance with the torque transmitted through the belt 28.

A similar arrangement is provided for measuring the torque transmitted through the belt 32, including an idler pulley 48 on a shaft 49 carried by an arm 50 which is pivotal on a shaft 51, a rod 52 connected to the arm 50 and extending through a coiled compression spring 53 engaged between a member 55 on the rod 52 and a fixed member 56. Arm 50 is connected through a link 57 to an arm 58 on the shaft of a potentiometer 59. In this arrangement, the pulley 48 is urged by the spring 53 away from a plane through the axes of the shafts 18 and 20 and as the torque transmitted through the belt 32 increases, the pulley 48 is moved toward a plane through the axes of the shafts 18 and 20. It is noted that the connections of links 45 and 57 to the pivotal arms 38, 46 and 50, 58 are at points such that the angular displacements of the potentiometer shafts are much greater than the corresponding angular displacements of the pulley support arms, which increases the accuracy of control. It is also noted that suitable idler pulleys 61 and 62 may preferably be engaged with the opposite portions of the belts 28 and 32 to take up slack in the belts.

Figure 2:
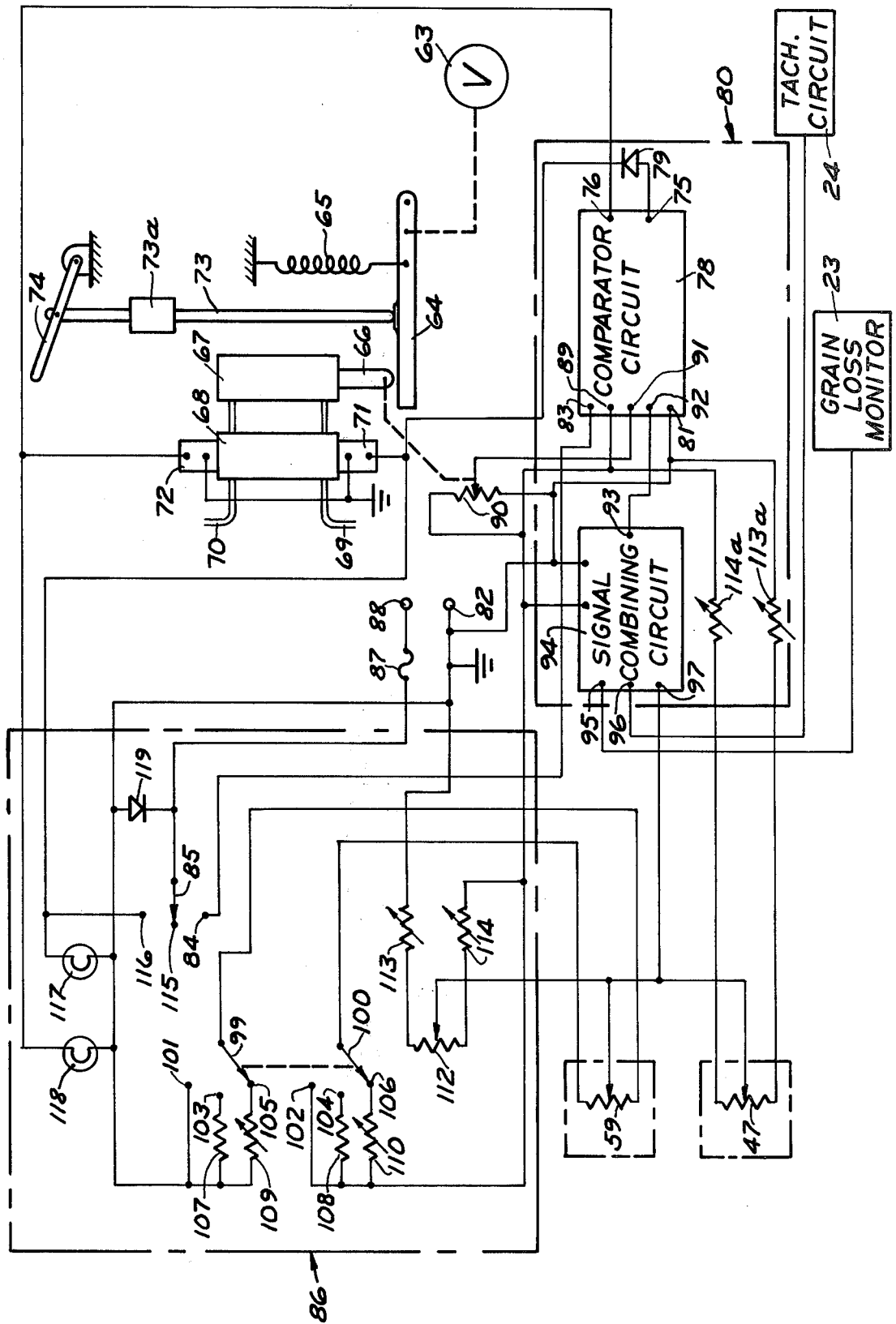
FIG. 2 is a schematic electrical and hydraulic diagram of the automatic control system.

FIG. 2 illustrates an arrangement for control of the hydrostatic drive system 13 in response to electrical signals developed in accordance with the positions of the potentiometers 47 and 59 and also in response to the signals developed by the grain loss monitor 23 and the tachometer circuit 24. A valve 63 of the hydrostatic control unit 13 is mechanically connected to an operating arm 64 which is urged by a spring 65 toward engagement with the lower end of a rod 66 which is connected to a piston within a hydraulic cylinder 67. The spaces on opposite sides of the piston are coupled through a control valve 68 to lines 69 and 70 which are connected respectively to a fluid reservoir and a charge pump, not shown. The valve 68 is controlled by solenoids 71 and 72. Solenoid 71, when energized, operates the valve 68 to cause fluid under pressure to be supplied from the line 70 to the space below the piston in the cylinder 67 and to move the rod upwardly, the space above the piston being coupled through the valve 68 to the reservoir line 69. The free end of the arm 64 may then be moved upwardly by the spring 65 to increase the speed of forward travel of the combine. Solenoid 72, when energized, causes an opposite operation, to reduce the speed of forward travel of the combine.

A control rod 73 is provided which is engagable with the arm 64 and which is coupled to a manually operable lever 74 with a friction device 73a being provided for holding the rod 73 in any position to which it is adjusted. Rod 73 is illustrated in a neutral position, holding the arm 64 against upward movement and in a position such that the drive wheels of the combine are stationary. When rod 73 is moved downwardly, the arm 64 is pivotal against the force of the spring to cause reverse drive. When rod 73 is moved upwardly, the free end of the arm 64 may engage the lower end of the rod 66 to be controlled by the hydraulic cylinder 67, with the maximum speed being controlled by the position of the rod 73. The operator may override the automatic control by operating the lever 74 to cause movement of the rod 73 downwardly to reduce the maximum forward speed of the combine, to stop all movement or to cause reverse movement, as desired. It will be understood that other mechanical arrangements may be used to permit manual override of the automatic control and to reduce speed or stop the forward travel of the combine or cause reverse travel when desired.

Solenoids 71 and 72 have terminals connected together and to ground and terminals connected to output terminals 75 and 76 of a comparator circuit 78, a diode 79 being connected between output terminal 75 and the solenoid 71. The comparator circuit is physically located in an electronic circuit box 80 which may be in the operator's cab 17. The comparator circuit includes a terminal 81 connected to a negative terminal 82 of the electrical system of the combine which is preferably grounded, i.e., connected to the main frame of the combine. Another terminal 83 of the comparator circuit 78 is connected to a terminal 84 which is engagable by a control switch contact 85 in a control box 86. The control switch contact 85 is connected through a fuse 87 to a positive terminal 88 of the electrical system of the combine which may be at a positive potential of 14 volts relative to ground, by way of example.

The comparator circuit 78 further includes circuitry which develops a positive regulated voltage, ten volts for example, at a terminal 89 which is coupled to the load sensing potentiometers 47 and 59 and also to a feedback potentiometer 90 which has a movable contact mechanically coupled to the actuating rod 66 and which is electrically connected to an input terminal 91 of the comparator circuit 78. A second input terminal 92 of the comparator circuit 78 is connected to an output terminal 93 of a signal combining circuit 94 having input terminals 95 and 96 connected to the grain loss monitor unit 23 and the tachometer circuit 24 and having a third input terminal 97 connected to the movable contacts of the separator and feeder load sensing potentiometers 47 and 59.

Figure 3:
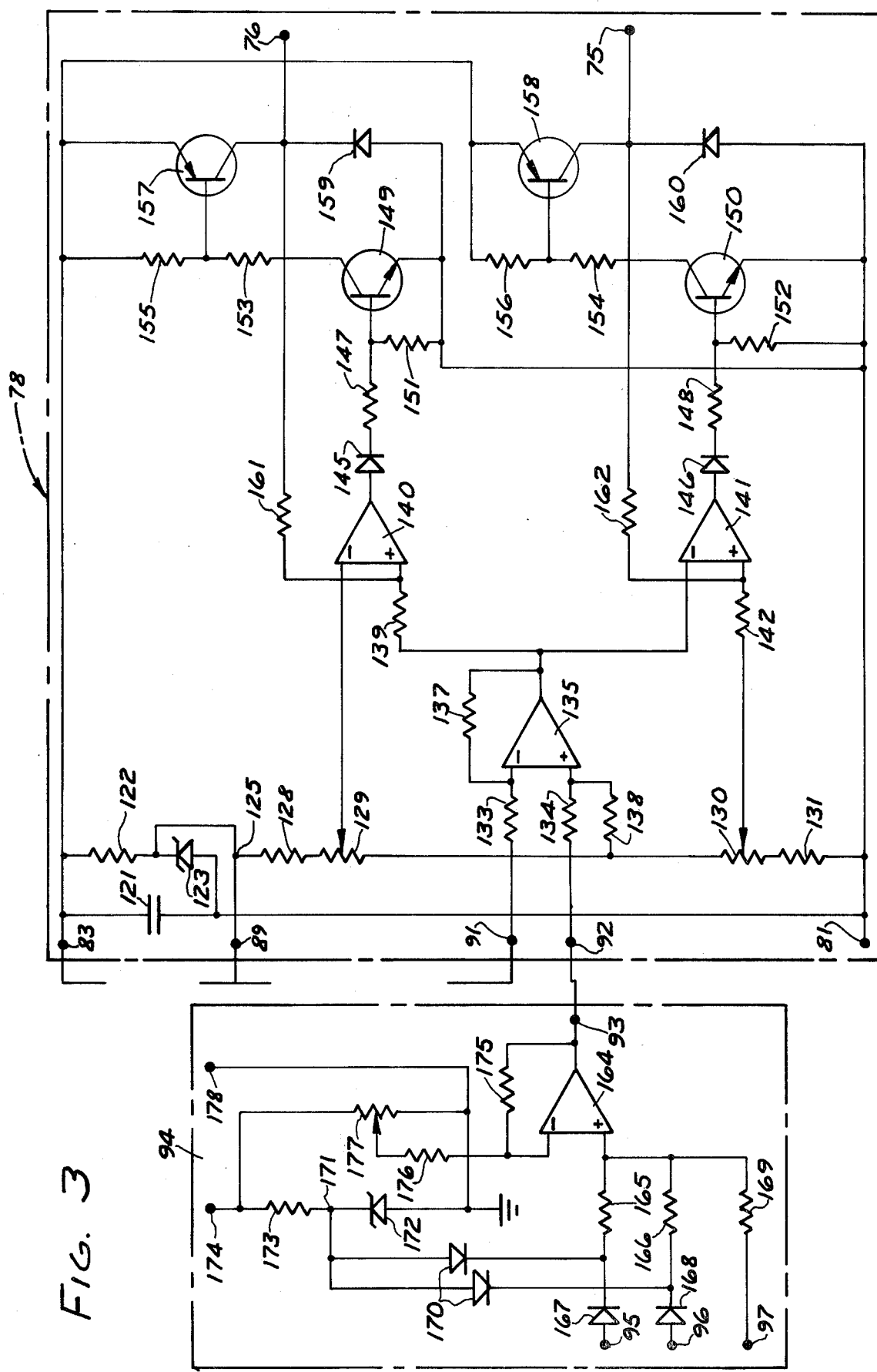
FIG. 3 is a circuit diagram of signal combining and comparator circuits above the system shown in FIG. 2.

The circuitry of the comparator circuit 78 and the signal combining circuit 94 are illustrated in FIG. 3 and described in detail hereinafter. In brief, the circuits evaluate outputs from the separator and feeder and load sensing potentiometer 47 and 59 and also from the grain loss monitors 23 and tachometer 24 in relation to an output from the feedback potentiometer 90 and controls the valve 68 until a balanced condition is reached. A difference between the desired load and the actual load causes a change in the position of the rod 66 and thereby a change in the position of the control arm 64 and the speed of travel of the combine. For example, if the combine should move into a region in which the crop is of increased density to increase the load on the separator and feeder mechanisms, the voltage developed from the separator and feeder load sensing potentiometers 47 and 59 and applied through the signal combining circuit 94 to the input terminal 92 of the comparator circuit 78 is increased. Current is then applied from the output terminal 75, the valve 68 being actuated in a direction to supply fluid to the upper end of the cylinder 67 to move the rod 66 downwardly. An increased voltage is then supplied from the feedback potentiometer 90 to the input terminal 91 and a balanced condition is rapidly obtained with the control arm 64 being moved to a position such as to cause drive of the combine at a slower speed and such as to reduce the load on the separator and feeder mechanisms. The comparator circuit includes amplifier means for obtaining rapid response and the provision of the feedback signal from the feedback potentiometer 90 insures a high degree of stability in the control. The speed of operation may also be reduced in response to increased signals from the grain loss monitor 23 and the tachometer circiut 24, to prevent undue loss of grain and to prevent the engine speed from dropping below a certain value.

The control box 86 is located in the operator's cab 17 and includes, in addition to the control switch contact 85, a load control which allows setting up of the load at an optimum level and a switch for providing an adjustment when substantial changes are made in feeder load requirements, as when changing from low power requirement grain heads to high power requirement corn heads. The adjustment switch includes a pair of ganged movable contacts 99 and 100 which are connected to end terminals of the potentiometer 59 and which are selectively engagable with a first pair of contacts 101 and 102 for operation in a low load range, a second pair of contacts 103 and 104 for operation in a medium load range and a third pair of contacts 105 and 106 for operation in a high load range. Contacts 101 and 102 are respectively connected to ground and to the regulated positive voltage output terminal 89 of the comparator circuit 78. Contacts 103 and 104 are respectively connected to the contacts 101 and 102 through a pair of fixed resistors 107 and 108 and contacts 105 and 106 are connected to the contacts 101 and 102 through a pair of resistors 109 and 110 which are adjustable in the illustrated circuit. In the low load range, when the contacts 99 and 100 are engaged with the terminals 101 and 102, only a small movement in the position of the movable contact of the potentiometer 59 is required to produce a given change in the voltage of the movable contact. In the medium and high range positions, substantially larger movements are required to produce the same change in voltage.

As illustrated, a potentiometer 112 is provided and a pair of resistors 113 and 114 are connected between the end terminals of the potentiometer 112 and ground and ther terminal 89, the movable contact of potentiometer 112 being connected to the movable contacts of potentiometers 47 and 59. Also, resistors 113a and 114a are provided in the electronic circuit box 80, connected between the end terminals of potentiometer 47 and the ground and regulated voltage terminals 82 and 89. In the illustrated circuit, resistors 113, 114, 113a and 114a as well as resistors 109 and 110 and potentiometer 112 are adjustable elements but it is not contemplated that they need to be adjusted by the operator of the combine or that they are accessible to the operator. They need to be adjusted only in a set-up operation during which the requirements for a particular combine are being determined. Once the requirements for a particular combine are established, fixed elements may be substituted for the illustrated adjustable elements, if desired.

The control switch contact 85 is engagable with an intermediate unconnected contact 115 in an "off" position and with a third contact 116 in a "set" position. Contact 116 is connected to the solenoid 71 to cause energization thereof and to cause retraction, i.e., upward movement of the control rod 66, in case of malfunction of the electronic circuitry, the position of the arm 64 being then controlled by the manually operable control rod 73.

A pair of indicator lights 117 and 118 are provided, respectively connected to the solenoids 71 and 72, light 117 indicating faster speed and light 118 indicating slower speed. A protective diode 119 is connected between switch contact 85 and ground.

FIG. 3 shows the circuitry of the comparator circuit 78 and the signal combining circuit 94. The power input terminal 83, which may be at a positive potential of on the order of 14 volts, is connected to the ground terminal 81 through a filter capacitor 121 and is also connected through a resistor 122 to the regulated supply voltage terminal 89 which is connected through a Zener diode 123 to the ground terminal 81, the diode 123 being operative to develop a regulated voltage at the terminal 89. This regulated voltage is applied to the load sensing and feedback potentiometers as described above. It will be understood that other types of regulated voltage supply circuits may be used.

Terminal 89 is connected to a bias network including a fixed resistor 128, potentiometers 129 and 130 and a second fixed resistor 131, connected in series between the circuit point 125 and the ground terminal.

The input terminals 91 and 92 are connected through resistors 133 and 134 to minus and plus inputs of an operational amplifier 135, the minus input being also connected through a resistor 137 to the output of the amplifier 135 and the plus input being also connected through a resistor 138 to the junction between potentiometers 129 and 130 in the bias network. The output of the operational amplifier 135 is connected through a resistor 139 to the plus input of an operational amplifier 140 and is also directly connected to the minus input of a second operational amplifier 141, the minus input of amplifier 140 being connected to the movable contact of potentiometer 129 and the plus input of amplifier 141 being connected through a resistor 142 to the movable contact of potentiometer 130. The outputs of amplifiers 140 and 141 are connected through diodes 145 and 146 and resistors 147 and 148 to the base electrodes of a pair of transistors 149 and 150. The base electrodes of transistors 149 and 150 are connected through resistors 151 and 152 to the ground terminal 81 and the emitters thereof are directly connected to the ground terminal 81. The collectors of the transistors 149 and 150 are connected through resistors 153 and 154 to circuit points which are connected through resistors 155 and 156 to the power supply terminal 83 and which are also connected to the base electrodes of a pair of power transistors 157 and 158, the emitters of transistors 157 and 158 being connected to the power supply terminal 83 and the collectors thereof being connected to the output terminals 75 and 76 and also through protective diodes 159 and 160 to the ground terminal 81. Feedback resistors 161 and 162 are connected between the output terminals 76 and 75 and the plus input terminals of the operational amplifiers 140 and 141.

In operation, neither of the output transistors 157 or 158 is normally conductive. When the potential of the input terminal 92 increases in a positive direction relative to the potential of the input terminal 91 as, for example, when the separator and feeder loads increase, the operational amplifier 135 applies an increased voltage to the plus input of operational amplifier 140 and to the minus input of the operational amplifier 141. The increased output of the amplifier 140 causes conduction of transistor 149 and thereby causes large conduction of current by transistor 157. As a result, current is supplied from output terminal 76 to the solenoid 72 while no current is supplied from output terminal 75 to the solenoid 71. The valve 68 then operates to admit fluid under pressure to the upper side of the cylinder 67 and to allow fluid from the lower end of the cylinder 67 to flow to the reservoir, the control rod 66 being moved downwardly. The downward movement of the control rod 66 moves the movable contact potentiometer 90 in a direction to increase the voltage applied to input terminal 91 and to bring about a balance in which neither of the output transistors is conductive. Thus within a short interval of time, the rod 66 is moved to a lowered position such as to reduce the speed of forward travel of the combine to the desired value. A reverse type of operation takes place when the loads decrease, in which case the transistor 158 is caused to conduct while the transistor 157 is non-conductive. If the feeder and separator loads are proper and in the proper relationship, neither of the transistors 157 or 158 conducts and a uniform speed is maintained until such time that a speed change is indicated as being required.

The signal combining circuit 94 comprises an operational amplifier 164 having a plus input connected through resistors 165 and 166 and diodes 167 and 168 to the input terminals 95 and 96 and connected through a resistor 169 to the input terminal 97. The junctions between resistors 165 and 166 and diodes 167 and 168 are connected through a pair of diodes 170 to a circuit point 171 at a reference potential, circuit point 171 being connected through a Zener diode 172 to ground and through a resistor 171 to a supply terminal 174 which is connected to the regulated output voltage terminal 89 of the comparator circuit 78. The minus input of amplifier 164 is connected to the output thereof through a resistor 175 and is also connected through a resistor 176 to the movable contact of a potentiometer 177 connected between the supply terminal 174 and a ground terminal 178 which is connected to the ground terminal 81 of the comparator circuit and to the negative terminal 82 of the combine electrical system.

The output of the operational amplifier 164 is determined by the difference between the voltage applied to the plus input thereof through resistors 165, 166 and 169 and the voltage applied to the minus input thereof from potentiometer 177. Under conditions in which the grain losses are within acceptable limits and engine speed is above a certain value, the output voltages of the grain loss monitor unit 23 and the tachometer circuit 24, applied to terminals 95 and 96, are below the reference potential of the circuit point 171 so that the potential of the plus input of the amplifier 164 is determined solely by the value of the reference potential at circuit point 171 and the value of the voltage applied from the load-sensing potentiometers to input terminals 97. Potentiometer 177 may be adjusted to obtain the desired relationship between the output voltage of the amplifier 164 and the voltage derived from the load-sensing potentiometers.

When the output voltage of either the grain loss monitor circuit 23 or the tachometer circuit 24 exceeds the reference potential of the circuit point 171, it is applied through the diode 167 and resistor 165 or through the diode 168 and resistor 166 and the potential of the plus input of amplifier 164 is moved in a positive direction. Through the comparator circuit 78, control valve 68 and hydraulic cylinder 67, the speed of travel of the combine is then reduced. Thus the speed of travel of the combine is automatically reduced in response to an increase in grain loss above an acceptable level, to further aid in obtaining efficient combine operation, and is also automatically reduced when the engine speed drops below a certain value.

In the operation of the system, the contacts 99 and 100 are positioned to provide an adjustment according to power requirements. For example, they may be engaged with contacts 101 and 102 for low power requirement grain heads and may be engaged with contacts 105 and 106 for high power requirement corn heads. It is noted that since the contacts 99 and 100 are connected to the ends of the feeder load sensing potentiometer 59, the adjustment is primarily with respect to the sensitivity of the control to changes in the feeder loading, rather than to the loading of the separator shaft or the total load. As above noted, the resistors which are illustrated as being adjustable are intended only for use in an initial set-up operation when determining the requirements for a particular type of combine and once such requirements are established, fixed resistors may normally be used, and if adjustable resistors are provided they should be inaccessible to the operator and used only for adjustment by qualified personnel.

The control rod 73 may be set to limit the maximum forward speed of travel and may be moved downwardly at any time to stop forward movement, or to cause reverse movement. In the event of failure of the electronic control system or if for any other reason manual control is desired, switch contact 85 may be placed in its set position in which it is engaged with contact 116, to cause retraction of the control rod 66 upwardly and may then be placed in the off position in which it is engaged with contact 115, to allow control of the position of the arm 64 by the manual control rod 73.

It will be appreciated that the system is relatively simple and straight-forward in construction and operation. Very little physical space is required for the components of the system so that the mechanical construction of the combine can be such as to make optimum use of physical space and also so that the system can be readily applied to existing combine designs with little alteration thereof. It can be readily incorporated in combines of the type diagrammatically illustrated which include a hydrostatically controlled transmission and belt or chain driven separator shafts, it being here noted that terms such as "belt" and "pulley" are used herein in a generic sense to include equivalents such as chain and sprocket drives. It can also of course be modified for use with other types of torque measuring devices and to control transmissions other than hydrostatically controlled transmissions.

It will be further understood that other modifications and variations may be effected without departing from the spirit and scope of the novel concepts of this invention.

We claim as our invention:

1. A control system for a combine including an engine, drive wheels, a transmission for driving said drive wheels from said engine, said transmission having a variable drive ratio, crop cutting, conveying and separator means, and means for driving said crop cutting, conveying and separator means from said engine, said control system comprising: a movable control element for controlling said variable drive ratio of said transmission to control the speed of travel of the combine, electrically controllable actuator means for said control element, a comparator circuit including amplifier means for controlling said actuator means, said comparator circuit having first and second inputs and being operative through said actuator means, control element and transmission to cause the forward speed of travel of the combine to be reduced when a signal applied to said first input is changed in one direction relative to a signal applied to said second input and to cause the forward speed of travel of the combine to be increased when a signal applied to said first input is changed in an opposite direction relative to a signal applied to said second input, first and second transducer means for developing first and second signals respectively varying as first and second proportional functions of first and second variables, adjustable electrical component means for adjusting one of said first and second proportional functions relative to the other of said first and second proportional functions, one of said variables being the power applied from said engine to said cutting, conveying and separator means and the other of said variables being said variable drive ratio of said transmission, and means for applying said first and second signals from said first and second transducer means to said first and second inputs of said comparator circuit with said first and second signals being applied in directions as to be brought into balanced relationship when the position of said control element and the corresponding speed of travel of the combine correspond to the power applied from said engine to said cutting, conveying and separator means in accordance with a certain function determined by the relation between said first and second proportional functions, said comparator circuit being operative through said actuator means, control element and transmission to cause operation of the combine at a uniform forward speed when said first and second signals are in said balanced relationship and being operative through said actuator means to change the position of said control element in response to a substantial change in the power applied from said engine to said cutting, conveying and separator means.

2. In a system as defined in claim 1, at least one of said first and second transducer means comprising a potentiometer having end terminals and a movable contact, a voltage source having a pair of terminals coupled to said end terminals and means for moving said movable contact in proportion to a change in the corresponding variable.

3. In a system as defined in claim 1, wherein said means for driving said crop cutting, conveying and separator means comprises a first pulley driven from said engine, a second pulley and an end-less belt entrained on said pulleys to drive said second pulley through one side of said belt, said first variable being the power applied from said engine to said cutting, conveying and separator means and said first transducer means comprising an idler pulley engaged with said one side of said belt, spring means urging said idler pulley in a direction transverse to a plane through the axes of said pulleys, and means for developing an electrical signal in response to displacement of said idler pulley in an opposite direction.

4. In a system as defined in claim 3, the last-mentioned means comprising a potentiometer having a movable contact mechanically coupled to said idler pulley.

5. In a system as defined in claim 4, a first pivotal arm supporting said idler pulley, a second pivotal arm connected to said movable contact of said potentiometer, and a link connected between said first and second pivotal arms.

6. In a system as defined in claim 5, the connection of said link to said first and second pivotal arms being such that the angular movement of said second pivotal arm is substantially greater than the corresponding movement of said first pivotal arm.

7. In a system as defined in claim 1, wherein said combine includes a separator drive shaft, said first variable being the power applied from said engine to said cutting, conveying and separator means, said first transducer means comprising means for developing said first signal as a function of drive torque applied to said separator drive shaft.

8. In a system as defined in claim 1, wherein said combine includes a feeder drive shaft, said first variable being the power applied from said engine to said cutting, conveying and separator means, said first transducer means comprising means for developing said first signal as a function of drive torque applied to said feeder drive shaft.

9. In a system as defined in claim 8, wherein said combine further includes a separator drive shaft, said first transducer means further comprising means for developing said first signal as a function of drive torque applied to said separator drive shaft.

10. In a system as defined in claim 9, said first transducer means comprising first and second potentiometers having end terminals and having movable contacts electrically coupled together, a voltage source coupled to said end terminals of both potentiometers, and means for mechanically moving said movable contacts of said first and second potentiometer in proportion to drive torques applied to said feeder and separator drive shafts.

11. In a system as defined in claim 1, manually operable override means engagable by said control element for limiting the forward speed of the combine.

12. In a system as defined in claim 11, said actuator means comprising an actuating rod movable in one direction toward engagement with said control element to move said control element in a direction to decrease the forward speed of travel of the combine, and spring means acting on said control element to urge said control element in an opposite direction, said manually operable override means including a manually actuatable rod adjustably movable in a direction generally parallel to the direction of movement of said actuating rod and engagable by said control element to limit the forward speed of the combine.

13. In a system as defined in claim 12, set switch means for applying an electrical control signal to said actuating means to move said actuating rod in a direction opposite said one direction and to a retracted position for control of the forward speed of travel of the combine solely through said manually actuatable rod.

14. In a system as defined in claim 1, resistance means having values determining the ratio between a change in at least one of said variables and a change in the corresponding signal applied to said comparator circuit, said values of said resistance means being predetermined in accordance with the characteristics of the combine and operating conditions thereof.

15. In a system as defined in claim 14, wherein the combine is operable in a plurality of different loading conditions, said resistance means including resistors having different values each predetermined in accordance with the characteristics of the combine and one of said loading conditions, and switch means for selective use of said resistors.

16. In a system as defined in claim 15, at least one of said first and second transducer means comprising a potentiometer having end terminals and a movable contact, a voltage source having a pair of terminals coupled to said end terminals and means for moving said movable contact in proportion to a change in the corresponding variable, said resistors being connectable by said switch means in series between said potentiometer end terminals and said voltage source terminals.

17. In a system as defined in claim 14, additional resistance means having values determining the relative levels of said first and second signals, said values of said additional resistance means being predetermined in accordance with the characteristics of the combine and operating conditions thereof.

18. In a system as defined in claim 17, at least one of said first and second transducer means comprising a potentiometer having end terminals and a movable contact, a voltage source having a pair of terminals coupled to said end terminals and means for moving said movable contact in proportion to a change in the corresponding variable, said additional resistance means comprising a control potentiometer having a pair of end terminals and a movable contact, means coupling said movable contact of said control potentiometer to said movable contact of said transducer means potentiometer, and means coupling said end terminals of said control potentiometer and said voltage source terminals, said movable contact of said control potentiometer being adjustable to adjust the level of the signal developed at said movable contact of said transducer potentiometer.

19. In a system as defined in claim 1, tachometer means coupled to said engine for developing an output signal when the speed of operation of said engine drops below a certain value, and a signal combining circuit for combining said signal from said tachometer means with a signal from said first transducer means and applying a signal to said first input of said comparator circuit for reducing the ratio of said transmission when the engine speed drops below said certain value.

20. In a system as defined in claim 1, wherein the combine includes non-grain conveying means for receiving from said separator means non-grain portions of the crop, grain loss monitor means associated with said non-grain conveying means for developing an electrical signal proportional to the presence of grain in the material conveyed by said non-grain conveying means, and a signal combining circuit for combining said signal from said grain loss monitor means with a signal from said first transducer means and applying a signal to said first input of said comparator circuit.

21. In a system as defined in claim 1, means for adjusting the relative levels of said first and second signals.

22. In a system as defined in claim 21, manually operable override means engagable by said control element for limiting the forward speed of the combine.

* * * * *